April 8, 1958  J. G. JARVIS  2,829,481
FORAGE HARVESTER

Filed Nov. 16, 1955  9 Sheets-Sheet 1

Inventor
JAMES G. JARVIS
by: J. Richard Cavanagh

April 8, 1958     J. G. JARVIS     2,829,481
FORAGE HARVESTER

Filed Nov. 16, 1955     9 Sheets-Sheet 2

Inventor
JAMES G. JARVIS by: J. Richard Cavanagh

April 8, 1958   J. G. JARVIS   2,829,481
FORAGE HARVESTER

Filed Nov. 16, 1955   9 Sheets-Sheet 3

Inventor
JAMES G. JARVIS
by: J. Richard Cavanagh

April 8, 1958  J. G. JARVIS  2,829,481
FORAGE HARVESTER

Filed Nov. 16, 1955  9 Sheets-Sheet 4

Inventor
JAMES G. JARVIS by: J. Richard Cavanagh

April 8, 1958

J. G. JARVIS 2,829,481

FORAGE HARVESTER

Filed Nov. 16, 1955

Inventor
JAMES G. JARVIS.
by: J. Richard Cavanagh

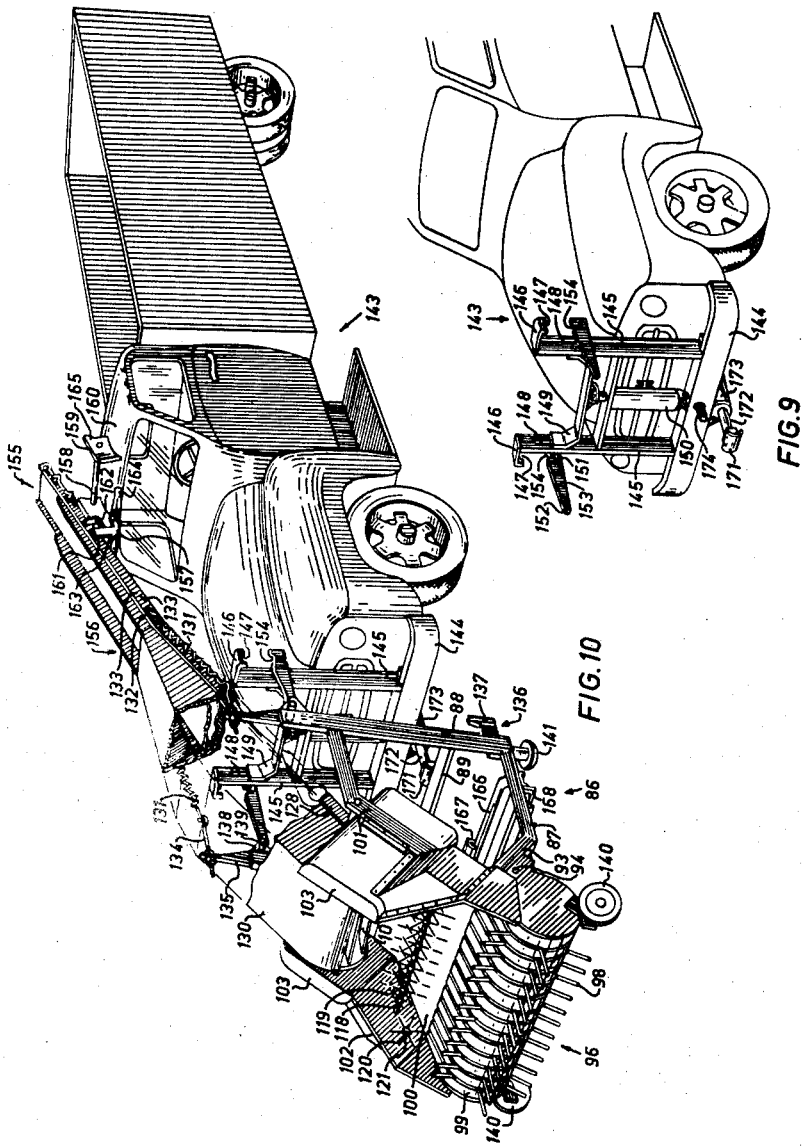

April 8, 1958  J. G. JARVIS  2,829,481
FORAGE HARVESTER

Filed Nov. 16, 1955  9 Sheets-Sheet 7

Inventor
JAMES G. JARVIS by: J. Richard Cavanaugh

Patent Agent

Inventor
JAMES G. JARVIS

April 8, 1958   J. G. JARVIS   2,829,481
FORAGE HARVESTER

Filed Nov. 16, 1955   9 Sheets-Sheet 9

*Inventor*
JAMES G. JARVIS by: J. Richard Cavanagh

United States Patent Office 2,829,481
Patented Apr. 8, 1958

2,829,481
FORAGE HARVESTER

James Gordon Jarvis, Meadowvale, Ontario, Canada, assignor to Grasslander Co. Limited, Milverton, Ontario, Canada Application November 16, 1955, Serial No. 547,203

4 Claims. (Cl. 56—1)

This invention relates to a forage harvester, particularly adaptable to the harvesting of hay, alfalfa and the like and for preparing same for direct feeding of livestock and/or for storage and to a method of harvesting hay and the like.

Prior hay harvesting devices are adapted to pick the hay up from a windrow after curing thereof and to convey the hay through a chopping device of the shear cutting type; that is, of a type having radial blades co-acting with a shear ledger blade. The cut material is usually blown into a bin carried by a vehicle. In such harvesters, it is the aim to reduce the material being cut to a very fine size and preferably to form a mulch therefrom; where the hay is relatively dry, the material is powdered during cutting.

It is also the aim of such devices to crush the material before or after cutting and to reduce it to a partially masticated mass.

Applicant has undertaken a number of experiments over the past years which show that forage processed by conventional harvesters employing a shear cutting principle and grinding means, is unsatisfactory for storage or for feed as compared with cleanly cut straw or alfalfa or the like where the leaves of the forage are preserved but the material is cut to substantially regular length of about hand size and breaking up, bruising and powdering of the material is avoided whereby a natural pasture type of feed obtained by grazing is more closely approximated and effectively duplicated. It is desired to note that the term "natural feed" as used herein is intended to define a feed size corresponding to a natural bite size of a grazing animal which in the case of cattle may be defined as about hand size. For example, a relatively uniform feed wherein the shaft lengths of the straw range between about two inches and about eight or ten inches would be considered a natural feed according to this specification. On the other hand, feeds comprised mainly of longer or shorter lengths of feed material than the range suggested would not be considered natural feed. The average length of a "natural feed" suitable for sheep may be less than that suitable for cattle.

It is the main object of the present invention to provide a method of harvesting hay and like forage products to provide a feed therefrom closely approximating a feed obtained by livestock in pasture grazing.

It is another object of the invention to provide a method of harvesting hay and the like to obtain a feed product adapted to storage without spoilage, bleeding and loss of nutrient juices.

It is a further object of the invention to provide forage harvesting apparatus embodying means for continuously conveying cut forage material from means for severing the conveyed material substantially to predetermined lengths of substantially natural feed size.

It is a still further object of the invention to provide forage harvesting apparatus adapted to be readily connected to or disconnected from a vehicle by driving the vehicle into and out of hitching relationship therewith substantially without requiring manual manipulation of the connecting means.

It is a still further object of the invention to provide a forage harvester of the self powered type carrying a small horsepower motor and adapted to be connected to a vehicle.

Other objects of the invention will be appreciated by a study of the following specification taken in conjunction with the accompanying drawing.

In the drawings:

Figure 1 having one part broken away to reveal structure shows a form of pressure cutting device having an expendable cutting blade according to the invention and showing a co-operating cutting drum therefor by way of example;

Figure 9 is a partial perspective view of a vehicle embodying harvester attachment means according to the invention;

Figure 10 is a partially cut away perspective view of harvester apparatus of the invention during a moment of approach of a vehicle as in Figure 9 theretoward to effect hitching therewith;

The drawings disclose a preferred form of pressure cutting unit specially adapted for use in the harvester shown. While various forms of cutting unit may be employed and while the invention may contemplate a rotary shear type of cutting unit of the reel cutter form operating in such manner that the use of additional crushing means is avoided, it is preferred herein to disclose those structures which are deemed of greatest utility and efficiency in accomplishing the objects of the invention having regard to the present knowledge of the applicant. Accordingly, a preferred and detailed form of pressure cutting unit will be disclosed by way of example so that the principles associated with the present invention will be clearly understood with reference to the embodiment of such a cutter unit in a harvester as contemplated herein.

Figure 1:
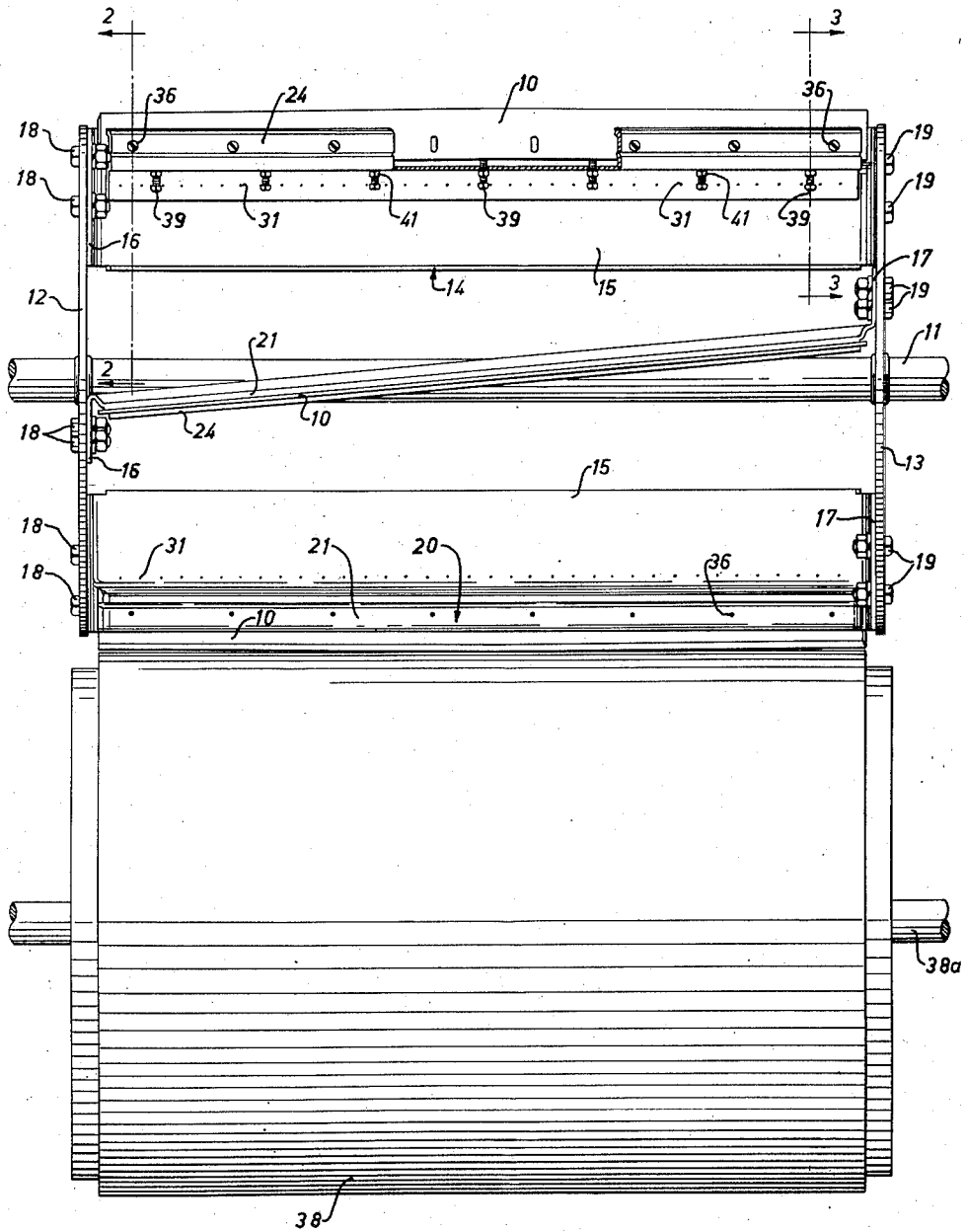

Referring to Figure 1, expendable pressure cutting blade strips or blade member 10 formed of straight, flat, relatively thin metal such as shear steel, are shown mounted for rotation about the axis of rotatable shaft 11 by end supports shown by way of example in the form of spaced apart discs 12 and 13 having blade mounting assemblies 14 extending therebetween. Each blade mounting assembly embodies a bracket member 15 having oppositely directed flanges 16 and 17 at the ends thereof adapted to be fastened to discs 12 and 13 by means of radially spaced apart bolts 18 and 19.

Figure 2:
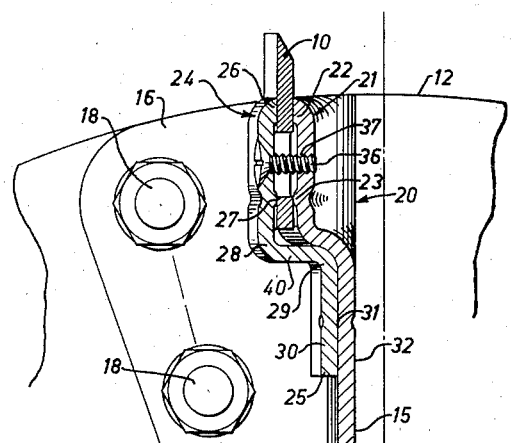
Figure 2 is an enlarged sectional view on the line 2—2 of Figure 1.
Figure 3:
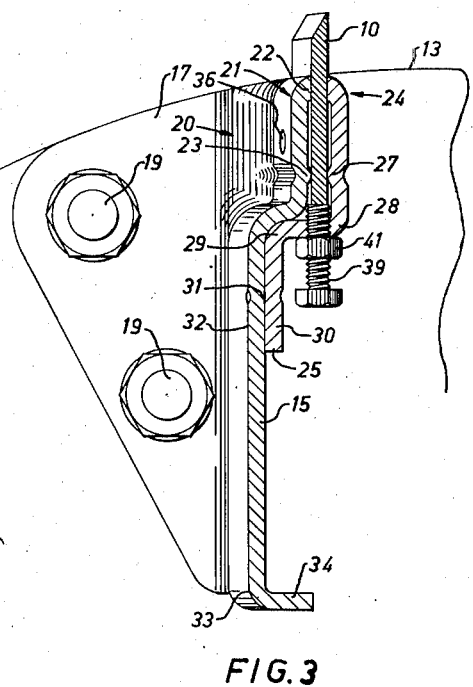
Figure 3 is an enlarged sectional view on the line 3—3 of Figure 1.

As is more clearly shown in Figures 2 and 3, the bracket 15 is preferably formed from a relatively heavy gauge piece of sheet metal, the ends of said piece being first turned to form the flanges 16 and 17 and thereafter the upper region 20 depressed such as by hot stamping methods to form one clamping jaw 21 having a clamping lip 22 and a clamping bead or shoulder 23 spaced therefrom and parallel thereto formed by a creasing or indenting operation. A co-operating or second clamping jaw 24 is formed from a separate strip of sheet metal 25 and embodies a similar clamping lip 26 and gripping shoulder or bead 27. In this case, however, the strip is bent or forged as at 28 and 29 to provide a supporting base or flange 30 adapted to be spot welded at a series of points 31 to the web portion 32 of the bracket 15. While it is preferred that the flange 30 of strip 25 be spot welded to the web 32, it may be fastened in any other suitable manner. The inner edge 33 of the web 31 is inturned to provide a flange 34 assisting in stiffening of the bracket.

Figure 4:
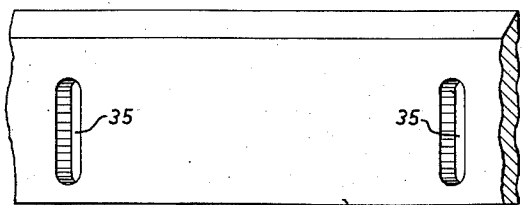
Figure 4 is an enlarged view of a portion of an expendable cutting blade according to the invention.

A pressure cutting blade 10 of the invention shown in more detail partially in Figure 4, is set between the clamping jaws 21 and 24. The mounting openings or slots 35 of the blade are aligned with the clamping screws 36 extending from one of the jaws through a blade slot 35 for threaded engagement as at 37 in the other clamping jaw. Referring also to Figure 1, a bracket carrying a cutting blade is brought into registry with the co-operating drum 38 on shaft 38a disposed in parallel spaced apart relation to shaft 11, in such manner that each end of the blade is first positioned for engagement with the surface of the drum and the end-most clamping screws 36 are tightened. The remaining clamping screws are left relatively loose until the cutting blade is adjusted along its length for engagement with the surface of the drum 38 by means of adjusting screws 39 threadably supported by the intermediate flange 40 of the clamping strip 25. Each adjusting screw 39 is turned to press the cutting blade outwardly to a desired position of adjustment after which the locking nut 41 is tightened. Thereafter, the untightened screws 36 may be turned for firm clamping of the blade 10 in the position of adjustment accomplished.

As shown in Figure 1, the brackets are formed to support the cutting blades in a longitudinal inclination of approximately five degrees. The blade remains flat and is not twisted and accordingly assuming that the drum 38 is truly cylindrical, it will be necessary to provide an outward curvature in the blade toward the central regions thereof. The adjustment described effects an outward curvature of the blade toward the mid-regions thereof for engagement with the surfaces of a truly cylindrical drum 38.

It will be apparent that in a construction wherein a pressure cutting blade is supported by a bracket of the invention in a position truly parallel in all respects to the axis of the supporting shaft 11, then the adjustment of the cutting blade described will serve to compensate for wear and distortions in the surfaces of the drum with which each blade comes into registry. The blade and supporting bracket construction of the invention enables the adjustment of the blade to compensate for peculiarities of construction encountered in providing a structure operating in accordance with pressure cutting principles and furthermore, compensates for prior disadvantages in such structures in respect to inefficiency of the cutting action due to wear of supporting surface for cutting, such as the drum surface and wear or damage to the edge of the cutting blade itself.

In this latter respect, the construction of the blade is of utmost importance in that the invention provides a cheap blade formed of a strip of suitable blade material having a series of equally spaced apart slots 35 extending the full length of the blade and which may be formed continuously in a simple manner by production methods and apparatus well known in the arts of fabricating industrial hacksaw blades and the like. Moreover, the cutting blades may be formed of special steels particularly adapted to the service intended.

A strip form of blade of a depth, i. e., strip width, up to about fifteen times the thickness thereof may be adjusted to an adjustment deflection of the order of one one-hundredth of its length without unduly stressing the cutting edge of the material of the blade. The strip blade width or depth should be less than about fifteen times the thickness and the length should be greater than about ten times the width so that an adjustment applying bending of the cutting edge outwardly to a medial deflection of about one one-hundredth of its length will occasion a maximum fibre stress in the cutting edge less than about fifteen hundred pounds per square inch in the shear steel.

The greater the longitudinal inclination of the blade, the greater deflection adjustment is required, to provide a cutting edge curvature to meet the surfaces of a cylindrical drum. Such curvature compensating adjustment may be avoided by providing a slightly longitudinally convex surface on the drum.

Figure 5:
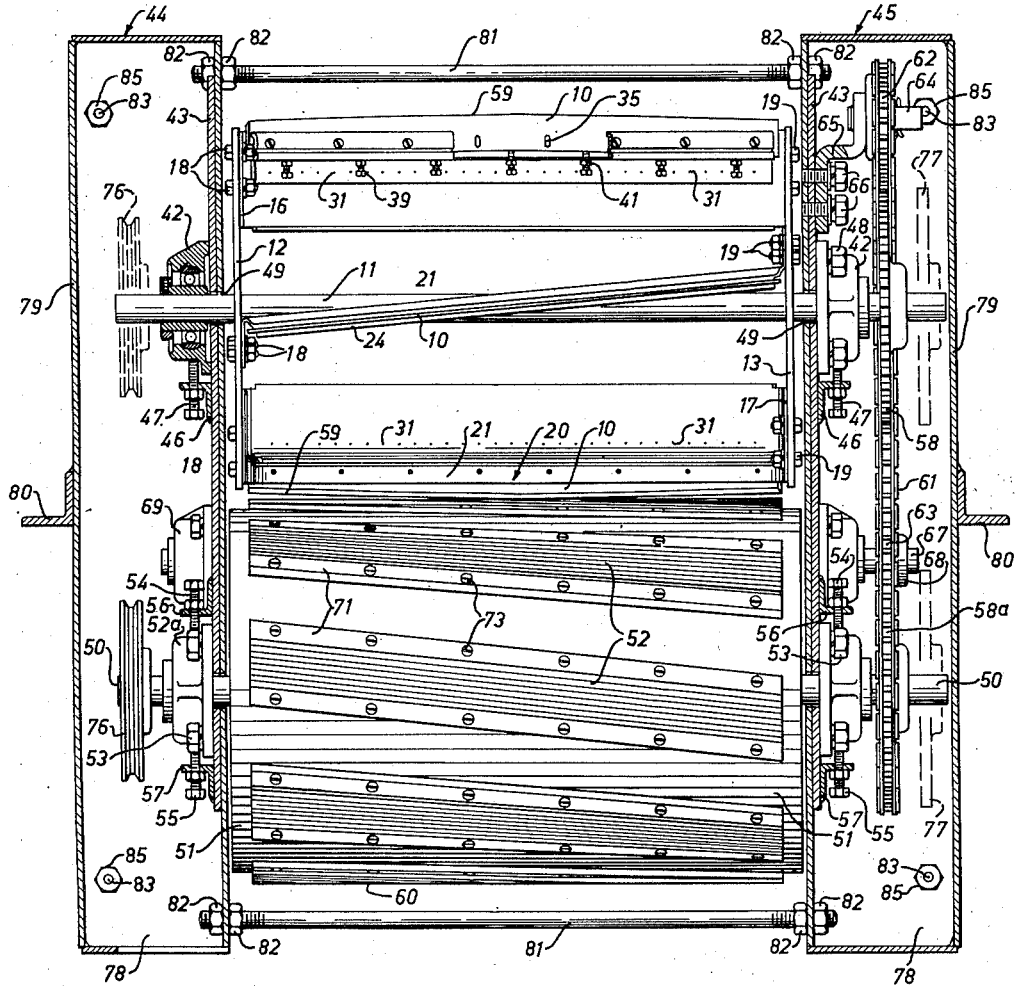
Figure 5 is a sectional view of a forage cutting unit according to the invention disclosing a modified form of co-operating pressure cutting supporting surfaces in the form of cutting strips arranged on a drum-like member.

In Figure 5, like numerals indicate like components of the previous figures. Shaft 11 is supported by suitable mounting means in the form of bearings 42 mounted on the inner side walls 43 of the side housings 44 and 45. Brackets 46 support adjusting screws 47 engaging the under surfaces of bearing housings 42 whereby the latter may be adjusted slightly upwardly or downwardly relative to side walls 43 by reason of slots (not shown) provided in the bearings to accommodate the mounting bolts 48 thereof so that shaft 11 may be adjusted in the enlarged holes 49 of the side walls. A similar arrangement is provided in the mounting of supporting shaft 50 which supports co-operating cutting means in the form of a drum-like member 51 carrying cutting strips 52 supported thereon for engagement by the cutting blades 10. The bearing housings 52a, however, are adjustable both upwardly and downwardly upon loosening of mounting bolts 53 by means of adjusting screws 54 and 55 supported by brackets 56 and 57. By this means, shaft 50 may be aligned in desired parallel spaced apart relationship with respect to shaft 11.

Figure 7:
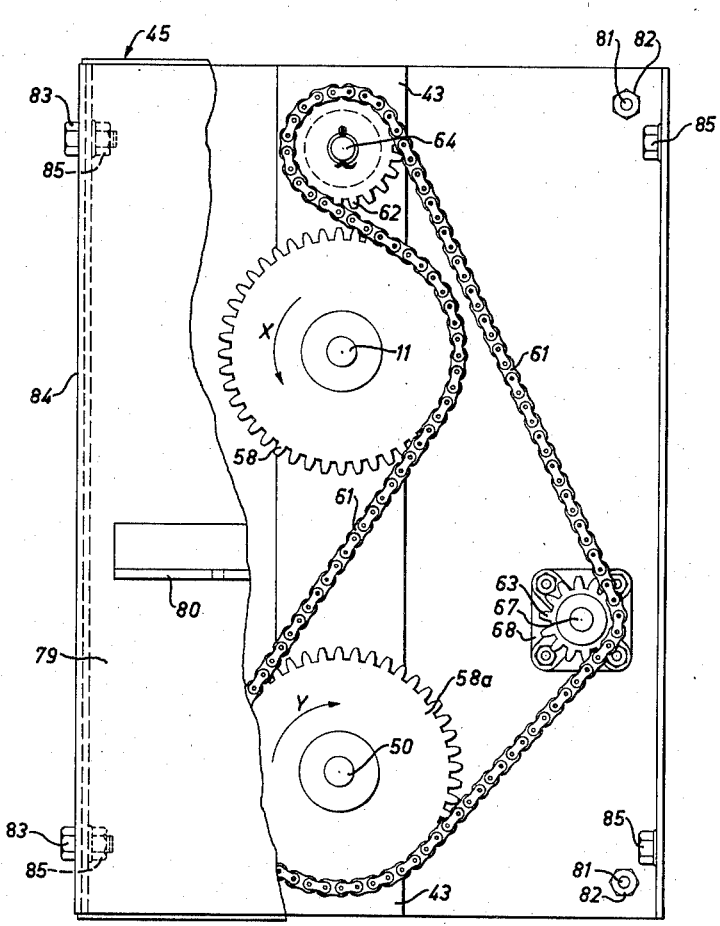
Figure 7 is an elevation of the right-hand portion of the unit of Figure 5 showing a portion of the cover removed to reveal a drive connection between components thereof.
Figure 8:
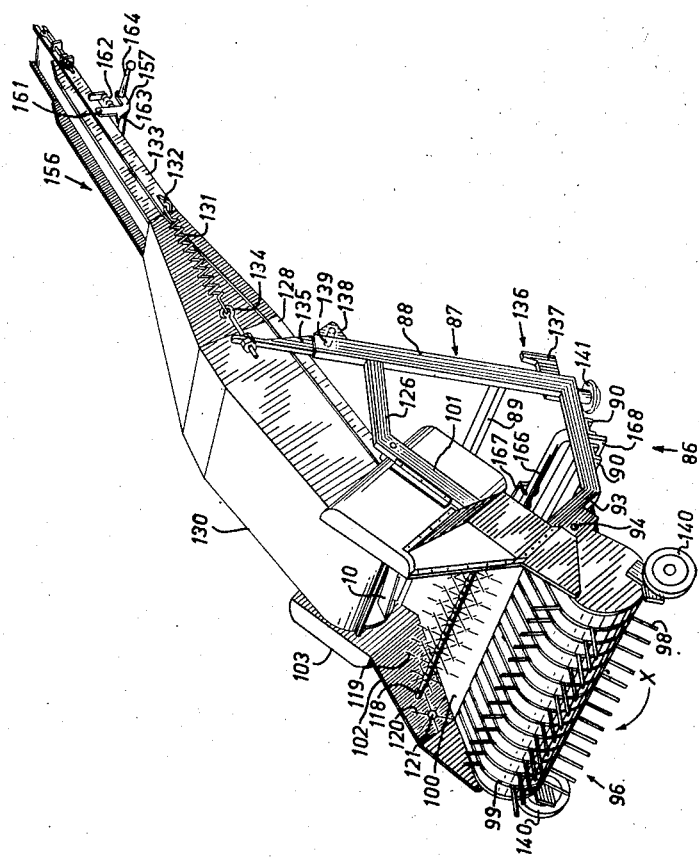
Figure 8 is a perspective view of forage harvesting apparatus according to the invention embodying a cutting unit; for example, of the form illustrated in Figures 1 to 7.
Figure 11:
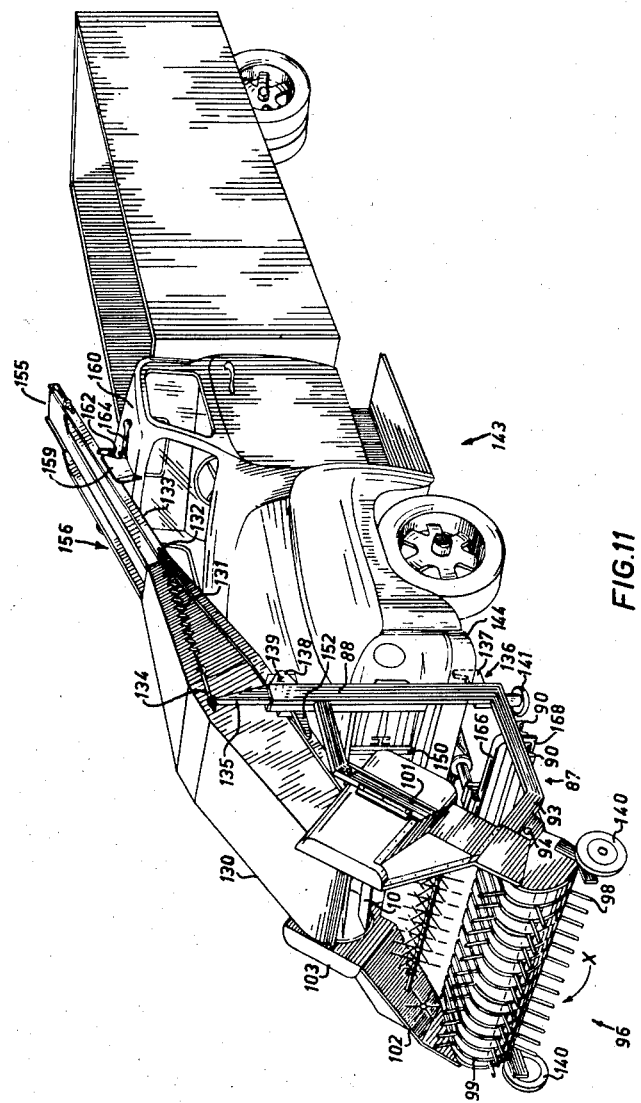
Figure 11 is a perspective view of the harvester apparatus and vehicle in assembly or hitched relationship.

As shown in Figure 7, shafts 11 and 50 carry sprockets 58 and 58a of such relative size that the peripheral speed of the cutting edges 59 of blades 10 will be the same as the peripheral speed of the pressure cutting supporting surfaces 60 of the cutting strips 52. Thus where the surfaces 60 are formed to move on a much larger radius of rotation than the cutting edge 59 as may be preferred for the cutting of difficult materials, for example, straw of high moisture content, then the sprockets 58 and 58a must be of such relative effective diameter each to the other that the peripheral speeds of the cutting supporting surfaces 60 and the blade cutting edges 59 are identical and the cutting edges synchronize in speed with the surfaces of the cutting strips. Synchronization is maintained preferably by employing a chain 61 shown passing about the two idler sprockets 62 and 63 in a manner providing opposite directions of rotation X and Y of shafts 11 and 59. Idler sprocket 62 is supported on stud shaft 64 of adjustable bracket 65 supported by bolts 66 on the inner wall 43 of side housing 45. Idler sprocket 63 is preferably fastened to a shaft 67 passing through a bearing 68 and extending for support in a corresponding bearing 69 on the opposite inner wall 43 of the other side housing 44. Shaft 67 may support a drive roller adapted to drive a conveying belt which passes thereabout to carry cut material away from the cutting unit. In the alternative, assuming the mechanism disclosed to be rotated in the reverse direction, shaft 67 may be employed to support a roller driving a conveyor adapted to draw material toward the cutting knives and rotating cutting strips.

Figure 6:
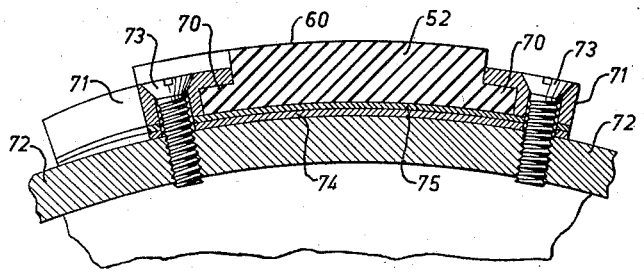
Figure 6 is an enlarged sectional view of one of the cutting strips on the drum-like member of Figure 5.

The cutting strips 52 may be formed of any suitable material such as rubber, scrap rubber belting, hard wood, bamboo or resin impregnated materials and preferably embody flanges 70 as shown in Figure 6 adapted to be gripped by clamping strips 71 fastened to the member 51 in this case taking the form of a cylinder 72 by means of screws 73. Preferably, shim strips 74 and 75 are inserted under the cutting strips 52 to compensate for wear in the pressure cutting supporting surfaces 60 thereof. Therefore, shims 74 and 75 are supplied in the first instance as accessories to be assembled under the cutting strips as may be required after use of the cutting unit for a substantial period of time. They are therefore of greatest utility in difficult to service areas and are otherwise not generally required.

In order to compensate for the longitudinal inclination of the cutting blades 10 as preferred herein, the cutting strips are likewise longitudinally inclined substantially as shown and may be contoured by filing or the like to provide a longitudinal convex contour in which case the cutting edges 59 of the cutting blades 10 will be straight when engaged therewith. On the other hand, the surfaces 60 may be cylindrical; that is, may form a part of a truly cylindrical surface about the axis of shaft 50 in which case the cutting edges 59 of the cutting blades 10 will necessarily be adjusted to a corrective curved contour by the adjusting screws 39 substantially as shown.

Either shaft 11 or shaft 50 may carry a pulley wheel 76 adapted for drive connection by means of a belt to a suitable drive motor (not shown). The sprocket ends of the shafts may also carry drive sprockets 77 from which drive connection may be made by means of a chain (not shown) to other apparatus required to be synchronized therewith and driven thereby, such as for example, for the feeding of material to or from the cutting unit. The side housing 44 and 45 embody outwardly directed walls 78 to which are bolted side covers 79 carrying mounting flanges 80 welded thereto. Suitable spacers in the form of the rods 81 extend between the inner side walls 43 at convenient locations and are fastened thereto by means of nuts 82.

It will be apparent that the device disclosed in Figure 5 may be removed from a utilizing farm implement as a unit and serviced in relation to the chain drive mechanism. Removal of the outer cover 79 of the side housing 45 is effected by unfastening bolts 83 passing through the overturned lip 84 of the outer cover 79 into the nuts 85 welded to the outwardly extending walls 78 of the housing. If desired, one complete side housing may be removed without disturbing the mounting of the remaining components of the unit in the other side housing. Likewise, other components of the device shown may be serviced without requiring substantial takedown of the remainder of the device.

The shafts 11 and 50 capable of simple and effective adjustment for parallelization and spacing in addition to adjustment of the radius of action of the cutting strips is also provided in conjunction with adjustment of the radius of action of the cutting blades and of the effective contour of both the cutting strips and cutting blades.

By reason of the light construction of the cutting blades, they are of a character likely to be preferentially damaged in the event of the passage of stones or the like through the cutting unit and in such event, replacement is practical by reason of relatively small cost. The ensilage pressure cutting unit of the invention provides a flexibility of adjustment and ease of replacement of thin strip type cutting blades whereby the pressure cutting action necessary to efficient cutting may be accomplished at all times in the practical sense with a minimum of difficulty and yet under substantially ideal operating conditions.

Figure 12:
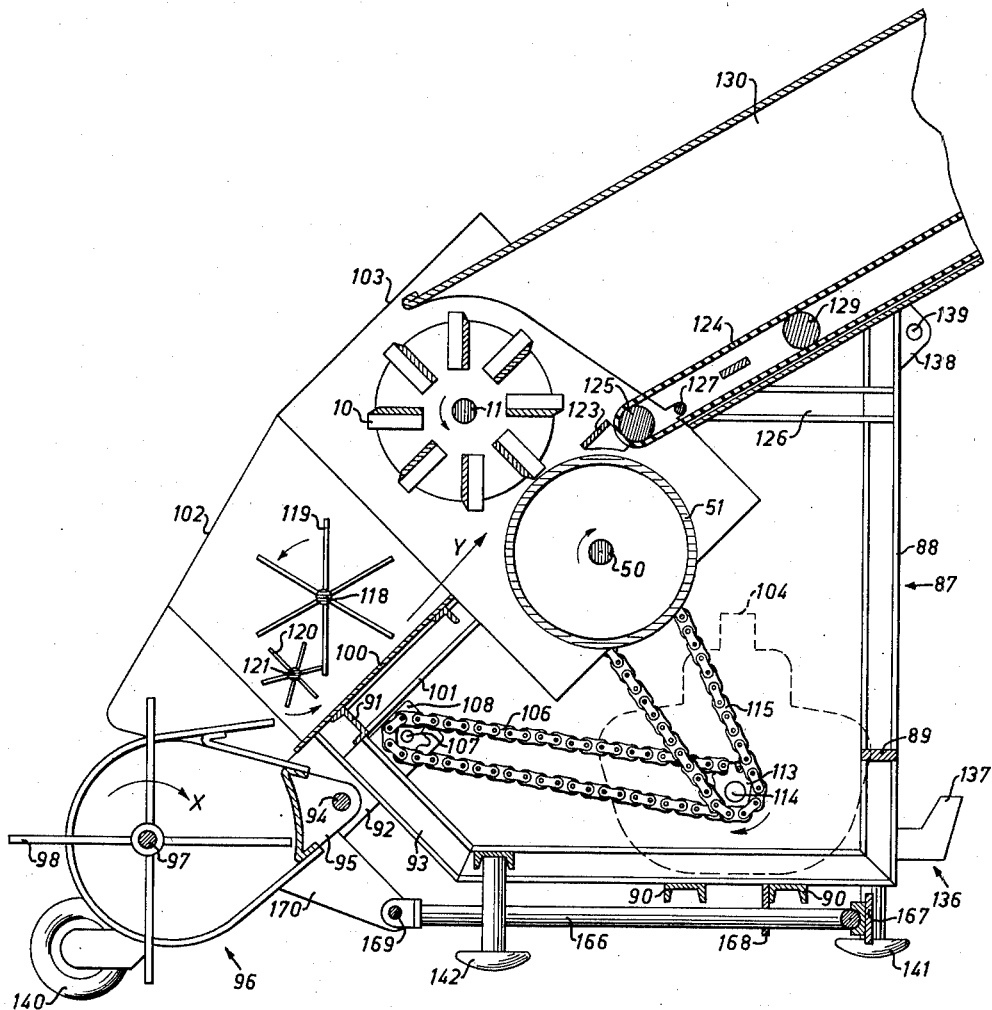
Figure 12 is a sectional view of harvester apparatus of the invention diagrammatically illustrating the location of the cutting unit thereof and drive connection with a motor which may form a part of the harvester.
Figure 13:
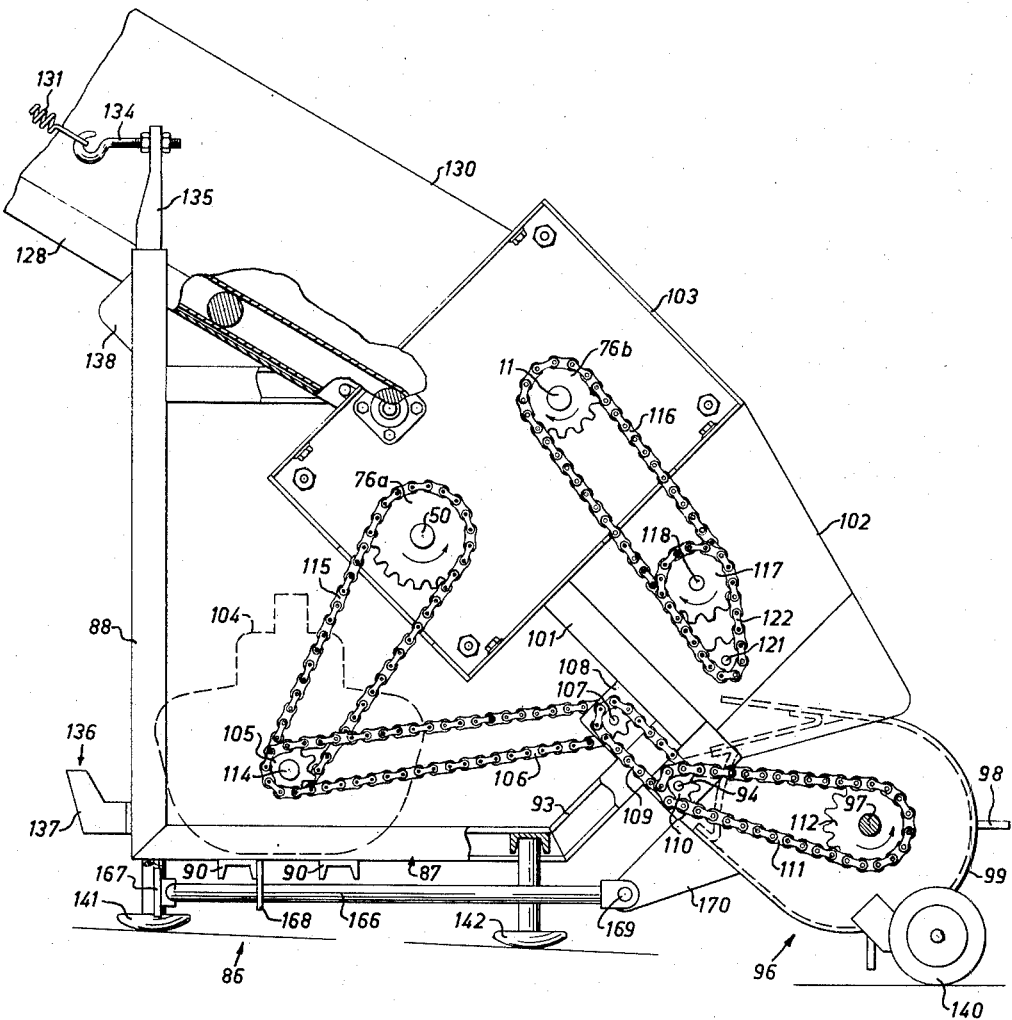
Figure 13 is a view of operatively relating drive connecting means for the various driveable components of the harvesting apparatus of the invention.

The forage harvester of the invention is generally indicated by the numeral 86 in the remaining figures and comprises the side frames 87 having uprights 88 held in rigid spaced apart relation by the cross bars 89, 90 and 91 (see also Figure 12). Mounting brackets 92 on the lower forwardly extending arms 93 support the transverse shaft 94 mounting end brackets 95 pivotally supporting forage crop retrieving means in the form of a substantially conventional straw pickup unit 96 having therein the eccentrically located shaft 97 and fingers 98 adapted to rotate in the direction of arrow X through corresponding slots 99 to deliver cut straw or the like to sheet metal ramp 100 supported on the upwardly sloping frame members 101. Converging side walls 102 rise upwardly from ramp 100 and converge inwardly to convey retrieved forage material relatively loosely toward a cutting unit 103 which preferably is identical to the cutting unit disclosed in Figures 1 to 7. A drive motor 104 indicated in chain lines in Figures 12 and 13 embodies a drive sprocket 105 connecting by chain 106 to a transfer drive sprocket shaft 107 supported in bracket 108 on arm 93 and connected in turn by chain 109, to a pivot shaft sprocket 110 effecting drive through chain 111 of pickup sprocket 112 driving shaft 97.

The cutting unit 103 is driven by sprocket 113 likewise on motor shaft 114 with sprocket 105 but connecting to chain 115 driving sprocket 76a corresponding to pulley wheel 76 of Figure 5. To effect driving of drum 51 and shaft 50 thereof, cutter shaft 11 is driven in the manner set forth in Figure 7 by operative relation with shaft 50 and likewise mounts a sprocket 76b in place of the upper pulley 76 suggested in Figure 5 which connects by chain 116 to sprocket 117 driving shaft 118 serving to rotate spring fingers 119 assisting loose conveyance of forage material to the cutting unit 103 (Figures 8, 10, 11, 12). If desired, assisting rotary fingers 120 mounted on side shafts 121 may be supported in suitable bearings (not shown) on the converging side walls 102 and driven by connecting chains 122.

As shown in Figure 12, the continuously conveyed material is loosely urged up the ramp 100 in the direction of arrow Y to feed between the cutting blades 10 illustrated in diagrammatic form in Figure 12 and the drum 51 to be thereby severed to a substantially uniform natural feed size as determined by the circumferential spacing of the cutting blades and thrown past the occluding support 123 to conveyor 124 supported on driving and pivoting roller 125 driven by shaft 67 (see Figure 7). The upper arms 126 of frames 87 carry inwardly directed stud shafts 127 pivotally supporting angle pieces 128 (Figure 8) supporting idler rollers 129 of the conveyor 124 and also supporting a tapered box structure or housing 130 therefor whereby the housing may be swung on the pivots or stud shafts 127 relative to the frames 87 against the force of the supporting biasing springs 131 extending from fitting 132 on the projecting conveyor frame 133 to eye bolts 134 supported on posts 135 of the uprights 88.

The harvester of the invention is preferably of a form adapted to be connected to a vehicle by the simple operation of driving the vehicle toward the harvester for engagement therewith and mutually locking. The harvester is likewise disconnected preferably without requiring the operator to leave the cab of the vehicle to which it is attached merely by effecting an unlocking action operative by the vehicle driver and withdrawing the vehicle from engagement with the harvester. Thus, in Figures 9 to 11, the uprights 88 of the harvester frames 87 carry locking means 136 in the form of rearwardly projecting hook-like members 137. The upper ends of the uprights 88 carry suspension pivoting means in the form of brackets 138 supporting the opposed inwardly projecting lugs 139. The frame 87 may be supported upon the ground by wheels 140 and rear legs 141 and forward leg 142 or by any other suitable means so that it rests in a tipped position when disconnected from a vehicle.

The vehicle 143 which in this case is illustrated in the form of a truck, carries member 144, preferably at the forward end, in this case being the bumper of the truck and which has fastened thereto the upright spaced apart standards 145 having clamping fittings 146 thereon having a depending portion serving as one jaw part 147 adapted for engagement with lugs 139 of the frames 87. The standards 145 each embody a vertical slot 148 adapted to slidably guide the transverse clamping frame 149 therein in vertical motion under actuation of the double acting hydraulic cylinder 150 actuated by a conventional hydraulic mechanism of the vehicle. Rigid pins 151 extend outwardly from the clamping frame 149 through slots 148 to support suspension engaging means in the form of the forwardly extending cam arms 152 having rearwardly and upwardly inclined ramp or cam surfaces 153 terminating rearwardly in seating means 154 serving as a movable or second jaw part adapted to co-operate with the first jaw part 147.

In operation, the vehicle 143 is driven toward the harvester as shown in Figure 10 for engagement of the cam arms 152 with lugs 139. The vehicle continues to move forward until the lugs 139 serving as pivoting suspension means for the harvester frame become engaged, that is, seat in the movable lower jaws 154 of the cam arms 152 after which the arms are raised under action of the hydraulic cylinder 150 thereby pivoting the harvester frame on the lugs 139 for rearward swinging movement of the frame and alignment of the latter with the vehicle for engagement of the locking means 137 below and behind the member 144. The locking means will be fully engaged as fully illustrated in Figure 11 when the cam arms 152 have been further raised for full clamping of the lugs 139 between the upper clamping jaws 147 and the lower clamping jaws 154. By this means, the harvester frame is securely locked to the vehicle 143.

When the harvester frame is in mutually locked position with the vehicle 143, the free end 155 of the conveyor assembly 156 is drawn downwardly against the force of biasing spring 131 by the operator gripping the manual locking lever 157 to effect engagement of the latter with the locking bar 158 supported between brackets 159 fastened to the cab 160 of vehicle 143. A locking arm 157 is pivoted as at 161 on the conveyor frame piece 133 and is biased forwardly by compression spring 162 for engagement of the locking spur 163 with the locking bar 158 and the handle 164 thereof with the locking shoulder 165 of bracket 159. The locking handle 164 enables a manual release of the conveyor 156 permitting the latter to be drawn upwardly to a natural position of clearance with the vehicle under action of the biasing spring 131.

When connected to a vehicle in the manner illustrated, the harvester of the invention is adapted to be actuated from the driving compartment or cab of the vehicle for positioning of the straw pickup unit 96. Thus, referring also to Figures 12 and 13, a bifurcated arm 166 having a centrally located engaging bracket 167 is slidably mounted through slotted supports 168 on frames 87 and projects forwardly thereof for pivotal connection as at 169 at the forward ends of side arms to brackets 170 extending rearwardly and downwardly from the pickup device 96. Accordingly, a pusher member 171 adapted to be controllably positioned by piston 172 of double acting hydraulic cylinder 173 effects engagement with the bracket 167 controlling the lifting of the pickup unit to a position of clearance with the ground surface if desired, the cylinder 173 being actuable from the driving compartment of the vehicle 143 by conventional hydraulic means.

While the harvester herein has been disclosed in a self-powered form in respect to driving of the pickup unit conveyors and the cutting unit, it will be understood that the harvester may be driven from a power take-off shaft 174 of vehicle 143 by operative connection therefrom to shaft 114, which latter in such instance will be supported on suitable supporting brackets.

It will be understood that the harvester frame shown is larger than necessary to accommodate the drive motor 104 carried by the frame. It will also be appreciated that while the harvester of the invention has been illustrated in a form adapted to be fastened to the forward end of a vehicle and to be pushed thereby, similar means for connecting the harvester to a vehicle to be drawn by the latter, is intended to be embraced by the invention.

It is therefore intended that the present disclosure should not be construed in a limiting sense other than that indicated by the scope of the following claims having regard to the prior art.

What I claim as my invention is:

1. A pick-up chopper for forage crops comprising: a finger type pick-up unit; a chopper unit including a feed drum-like member and cooperating longitudinally inclined pressure cutters; and a loose forage type conveying means between said pick-up and said chopper whereby the forage is picked up and delivered in a loose condition to said chopper unit to produce a forage which is of a desired length and which will retain a large percentage of its natural food values.

2. A pick-up chopper for forage crops comprising: a frame; a finger type pick-up unit on said frame; a chopper unit on said frame spaced from said pick-up unit and including a rotatable drum-like member and cooperating longitudinally inclined rotatable pressure cutters each in the form of a straight pressure cutting blade having a straight cutting edge; and a loose forage type conveying means between said pick-up unit and said chopper unit on said frame whereby the forage is picked up and delivered in a loose condition to said chopper unit to produce a forage of a desired length effectively retaining its natural food values.

3. A pick-up chopper for forage crops comprising: a frame; means rendering said frame mobile for passage over a crop; means on said frame for retrieving said crop as said frame moves thereover; a chopper unit on said frame spaced from said crop retrieving means and including a drum-like cutting support member and cooperating longitudinally inclined rotatable pressure cutters each in the form of a normally straight pressure cutting blade having a straight cutting edge; means for adjusting the engagement of the cutting edge of each blade with said support member; and a loose forage type conveying means between said pick-up unit and said chopper unit on said frame whereby the forage crop is retrieved and delivered in a loose condition to said chopper unit to produce a forage of desired length effectively retaining its natural food values.

4. A pick-up chopper for forage crops comprising: a frame; means rendering said frame mobile for passage over a forage crop; means on said frame for retrieving said crop as said frame moves thereover; a chopper unit on said frame spaced from said crop retrieving means and including a cutting support member and cooperating longitudinally inclined rotatable cutters each in the form of a normally straight cutting blade; means adjusting said cutters and said support member for cooperative cutting engagement cutting forage therebetween to a natural feed length; and a loose forage-type conveying means between said pick-up unit and said chopper unit whereby the forage crop is retrieved and delivered in a loose condition to said chopper unit to produce a forage containing a large percentage of its natural food values.

References Cited in the file of this patent

UNITED STATES PATENTS

| | | |
|---|---|---|
| 61,932 | Gale | Feb. 12, 1867 |
| 1,960,596 | Rimple | May 29, 1934 |
| 2,494,388 | Heth | Jan. 10, 1950 |
| 2,716,318 | Skromme | Aug. 30, 1955 |

UNITED STATES PATENT OFFICE

CERTIFICATE OF CORRECTION

Patent No. 2,829,481 April 8, 1958

James Gordon Jarvis

It is hereby certified that error appears in the above numbered patent requiring correction and that the said Letters Patent should read as corrected below.

In the grant, lines 2 and 3, for "assignor to Grasslander Co. Limited of Milverton, Ontario, Canada," read -- assignor, by mesne assignments, to Grasslander (1957) Limited, of Milverton, Ontario, Canada, --; line 12, for Grasslander Co. Limited, its successors" read -- Grasslander (1957) Limited, its successors --; in the heading to the printed specification, lines 3 to 5, for "assignor to Grasslander Co. Limited, Milverton, Ontario, Canada" read -- assignor, by mesne assignments, to Grasslander (1957) Limited, Milverton, Ontario, Canada --.

Signed and sealed this 18th day of November 1958.

(SEAL)
Attest:
KARL H. AXLINE
Attesting Officer

ROBERT C. WATSON
Commissioner of Patents